United States Patent
Choi et al.

(10) Patent No.: US 9,972,868 B2
(45) Date of Patent: May 15, 2018

(54) CURVED ELECTRODE STACK AND BATTERY PACK INCLUDING THE SAME

(71) Applicant: LG Chem, Ltd., Seoul (KR)

(72) Inventors: Eun Seok Choi, Daejeon (KR); Shin Hyo Cho, Daejeon (KR); Jae Bin Chung, Daejeon (KR); Dong-Myung Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days. days.

(21) Appl. No.: 14/893,362

(22) PCT Filed: May 8, 2014

(86) PCT No.: PCT/KR2014/004098
§ 371 (c)(1),
(2) Date: Nov. 23, 2015

(87) PCT Pub. No.: WO2015/016465
PCT Pub. Date: Feb. 5, 2015

(65) Prior Publication Data
US 2016/0133987 A1    May 12, 2016

(30) Foreign Application Priority Data

Jul. 31, 2013  (KR) ................. 10-2013-0091176
Jul. 31, 2013  (KR) ................. 10-2013-0091237

(51) Int. Cl.
*H01M 2/18*       (2006.01)
*H01M 10/058*    (2010.01)
(Continued)

(52) U.S. Cl.
CPC ........... *H01M 10/058* (2013.01); *H01M 2/18* (2013.01); *H01M 10/0436* (2013.01);
(Continued)

(58) Field of Classification Search
None
See application file for complete search history.

(56) References Cited

U.S. PATENT DOCUMENTS 5,958,088 A    9/1999   Vu et al.
7,049,028 B2   5/2006   Notten et al.
(Continued)

FOREIGN PATENT DOCUMENTS

EP   0928035 A1   7/1999
JP   4-78762      7/1992
(Continued)

OTHER PUBLICATIONS

International Search Report for Application No. PCT/KR2014/004098 dated Aug. 14, 2014.
(Continued)

*Primary Examiner* — Tracy Dove
(74) *Attorney, Agent, or Firm* — Lerner, David, Littenberg, Krumholz & Mentlik, LLP

(57) ABSTRACT

Disclosed herein are an electrode stack including at least one positive electrode, at least one negative electrode, and at least one separator, wherein the positive electrode, the negative electrode, and the separator are stacked such that the separator is disposed between the positive electrode and the negative electrode, one end of each of the positive electrode and the negative electrode does not intersect the other end of each of the positive electrode and the negative electrode, a stacked surface of each of the positive electrode, the negative electrode, and the separator includes a curved surface, and the negative electrode has an arc length equal to or greater than that of the positive electrode while the separator has an arc length greater than that of the positive electrode in a state in which the positive electrode, the
(Continued)

negative electrode, and the separator are curved, and a battery pack including the same.

27 Claims, 6 Drawing Sheets

(51) Int. Cl.
*H01M 10/04* (2006.01)
*H01M 10/42* (2006.01)
*H01M 10/052* (2010.01)
*H01M 2/02* (2006.01)
*H01M 4/02* (2006.01)

(52) U.S. Cl.
CPC ........ *H01M 10/425* (2013.01); *H01M 10/052* (2013.01); *H01M 2002/0205* (2013.01); *H01M 2004/025* (2013.01); *H01M 2010/4271* (2013.01); *H01M 2220/30* (2013.01)

(56) References Cited

U.S. PATENT DOCUMENTS

| | | |
|---|---|---|
| 2002/0160257 A1 | 10/2002 | Lee et al. |
| 2003/0039883 A1 | 2/2003 | Notten et al. |
| 2003/0108787 A1 | 6/2003 | Endo et al. |
| 2011/0097615 A1* | 4/2011 | Goh .................... H01M 2/0275 429/94 |
| 2012/0219874 A1* | 8/2012 | Suzuki ............. B29C 45/14336 429/480 |
| 2013/0108912 A1* | 5/2013 | Quek ...................... H01M 2/18 429/129 |
| 2013/0224562 A1* | 8/2013 | Momo ............. H01M 10/0436 429/149 |
| 2014/0011076 A1 | 1/2014 | Kanemoto et al. |
| 2014/0093762 A1 | 4/2014 | Goh et al. |

FOREIGN PATENT DOCUMENTS

| | | |
|---|---|---|
| JP | H11273709 A | 10/1999 |
| JP | H11-307130 A | 11/1999 |
| JP | 2001307762 A | 11/2001 |
| JP | 2003187759 A | 7/2003 |
| JP | 2004241250 A | 8/2004 |
| JP | 2005183242 A | 7/2005 |
| JP | 2006059671 A | 3/2006 |
| JP | 2008251583 A | 10/2008 |
| JP | 2009199912 A | 9/2009 |
| KR | 20040032965 A | 4/2004 |
| KR | 10-0833808 B1 | 5/2008 |
| KR | 20090097731 A | 9/2009 |
| KR | 20120024108 A | 3/2012 |
| KR | 20130018574 A | 2/2013 |
| WO | 2009113799 A2 | 9/2009 |
| WO | 2012133233 A1 | 10/2012 |

OTHER PUBLICATIONS

Extended European Search Report for Application No. EP14832182.1 dated Mar. 7, 2017.

* cited by examiner

【FIG. 1】
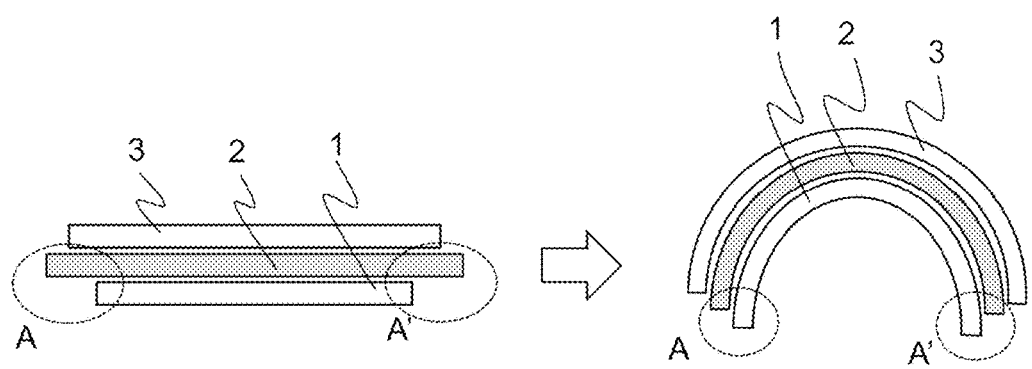
【FIG. 2】
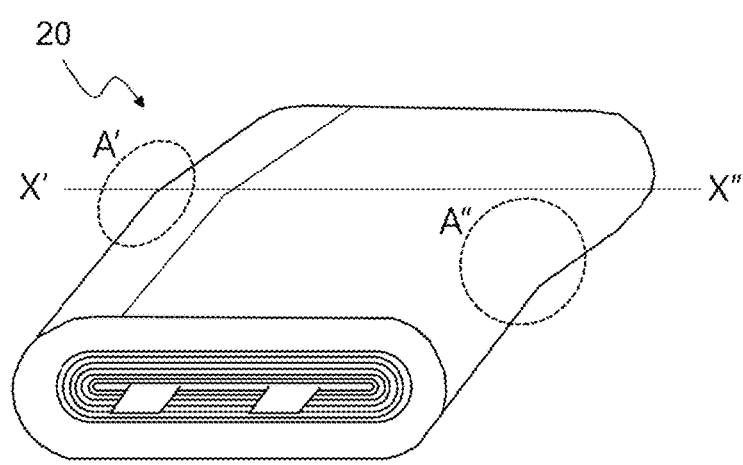

[FIG. 3]
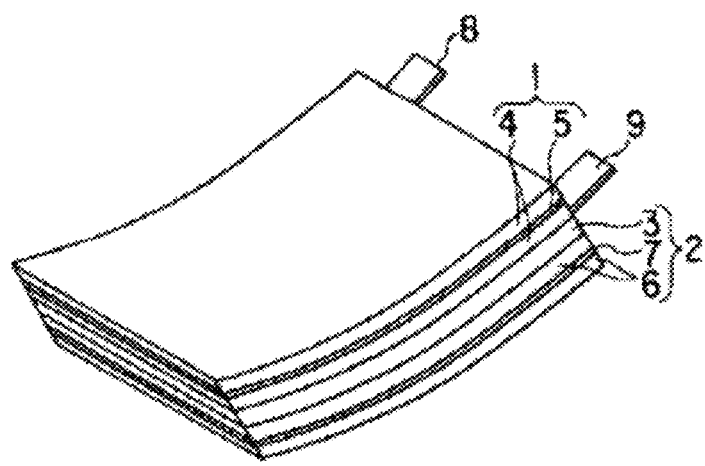
[FIG. 4]
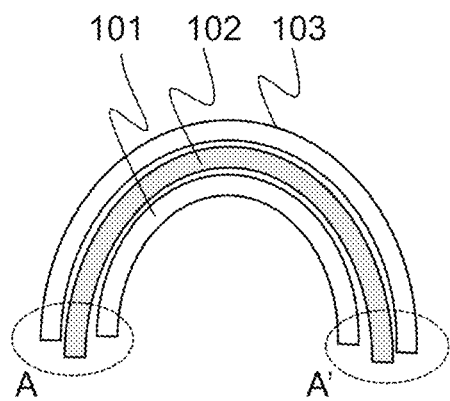

[FIG. 5]
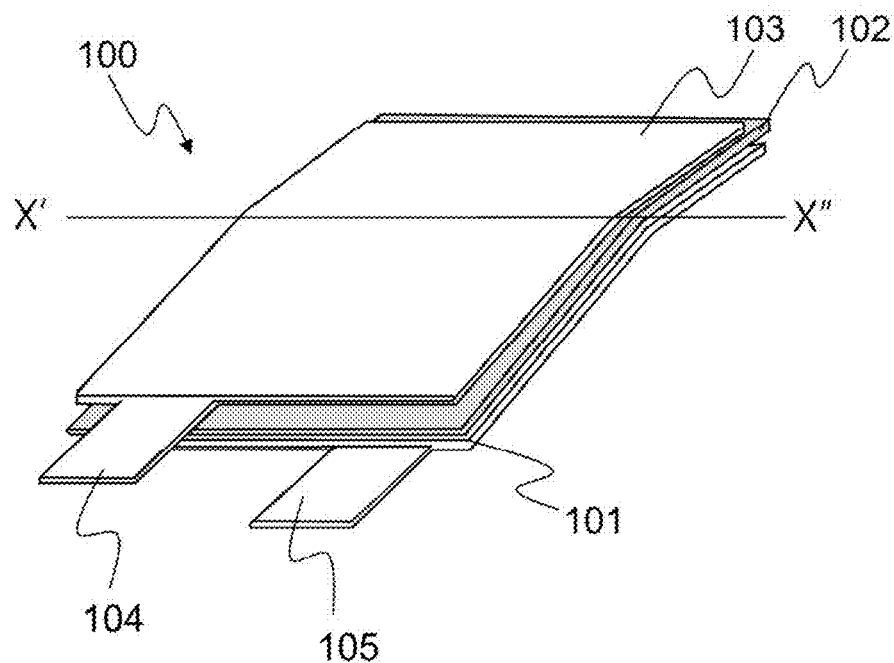
[FIG. 6]
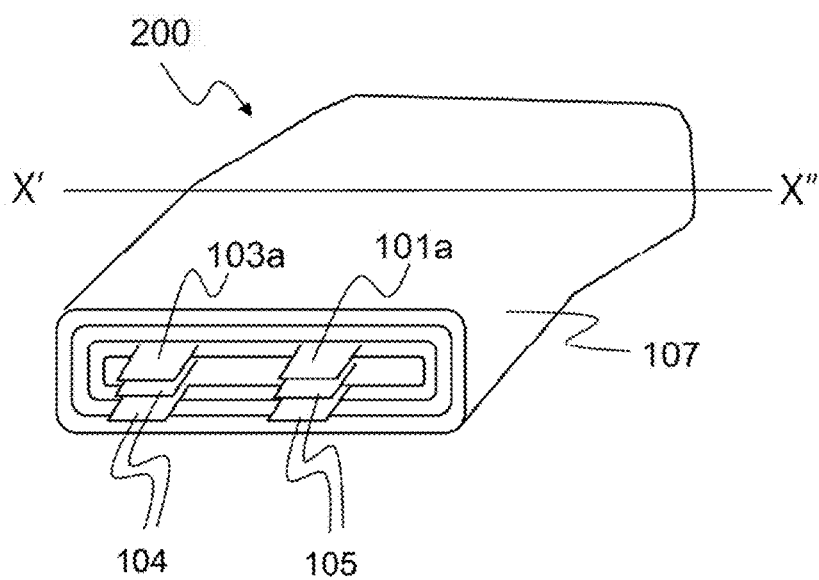

[FIG. 7]
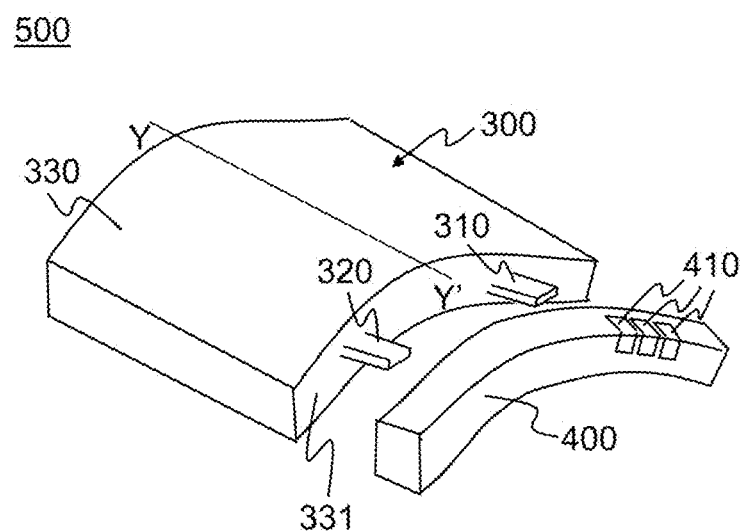
[FIG. 8]
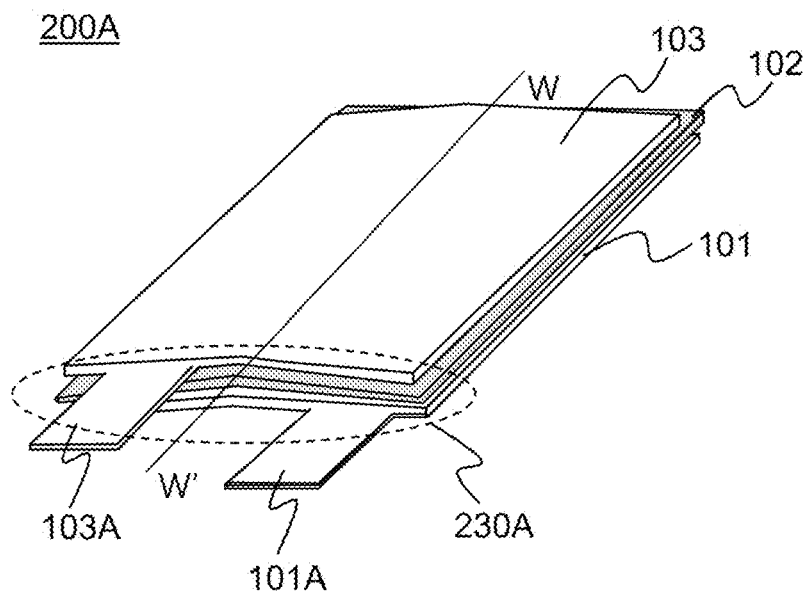

[FIG. 9]
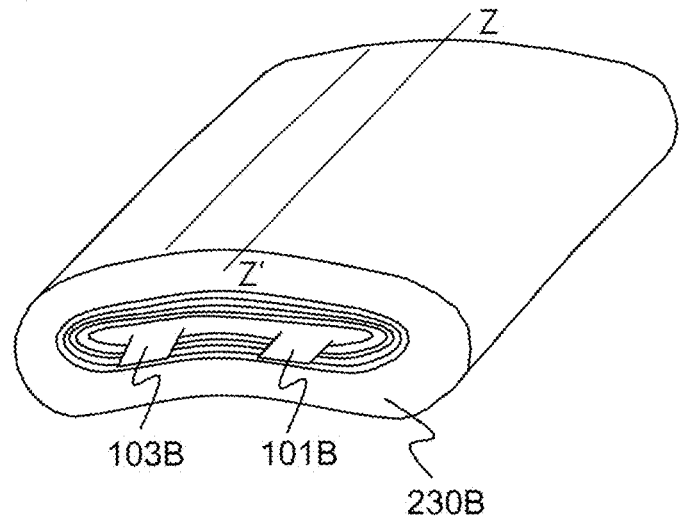
[FIG. 10]
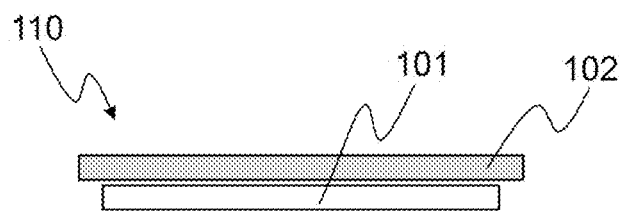
[FIG. 11]
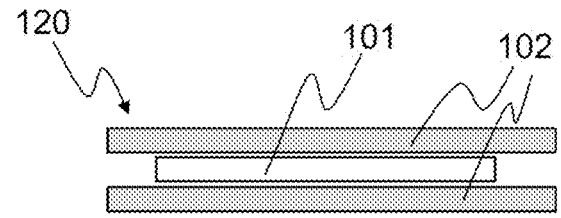

[FIG. 12]
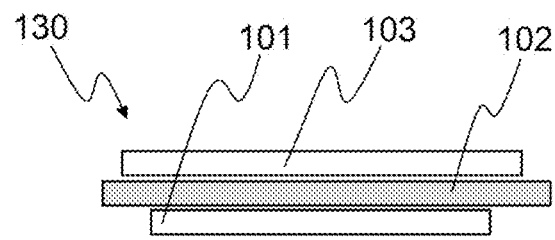
[FIG. 13]
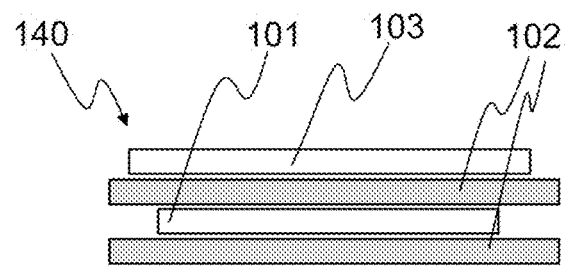
[FIG. 14]
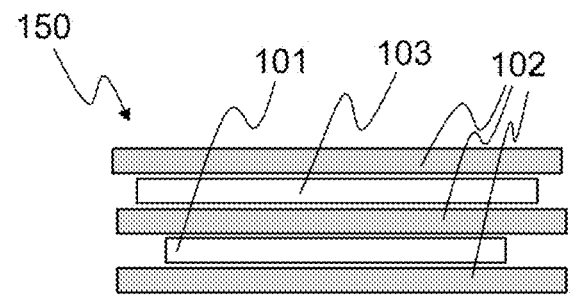

US 9,972,868 B2

CURVED ELECTRODE STACK AND BATTERY PACK INCLUDING THE SAME

CROSS-REFERENCE TO RELATED APPLICATION

This application is a national phase entry under 35 U.S.C. § 371 of International Application No. PCT/KR2014/004098, filed May 8, 2014, which claims priority to Korean Patent Application Nos. 10-2013-0091176 and 10-2013-0091237, filed Jul. 31, 2013, the disclosures of which are incorporated herein by reference.

TECHNICAL FIELD

The present invention relates to an electrode stack constituting a lithium secondary battery, and more particularly to a curved electrode stack and a battery pack including the same.

BACKGROUND ART

With remarkable development of information technology (IT), a great variety of portable information communication devices has been popularized. As a result, in the $21^{st}$ century, we are moving toward a ubiquitous society in which high-quality information service is possible regardless of time and place.

A lithium secondary battery is very important to realize such a ubiquitous society. The lithium secondary battery may be manufactured by receiving an electrode stack in a receiving part of a battery case together with an electrolyte and thermally bonding the outer edge of the receiving part.

Such an electrode stack may be classified as a stacked type electrode stack configured to have a structure in which positive electrode plates, separator plates, and negative electrode plates, each having a predetermined size, are repeatedly stacked such that the separator plates are disposed respectively between the positive electrode plates and the negative electrode plates, a wound (jelly-roll) type electrode stack configured to have a structure in which a positive electrode sheet, a separator sheet, and a negative electrode sheet, each having a predetermined size, are stacked such that the separator sheet is disposed between the positive electrode sheet and the negative electrode sheet, and then the separator sheet is wound in one direction, or a stacked and folded type electrode stack configured to have a structure in which a predetermined number of stacked type electrode stacks is arranged on a separator sheet, and then the separator sheet is wound in one direction such that the stacked type electrode stacks are stacked.

FIG. 1 is a view typically showing a state of an electrode stack, including a positive electrode 1, a separator 2, and a negative electrode 3, configured to have a structure in which the separator 2 is disposed between the positive electrode 1 and the negative electrode 3, and one end of each of the positive electrode 1 and the negative electrode 3 does not intersect the other end of each of the positive electrode 1 and the negative electrode 3, before and after the electrode stack is bent. For the convenience of description, a structure in which one positive electrode 1, one separator 2, and one negative electrode 3 are stacked is shown in FIG. 1. Alternatively, the electrode stack may include a plurality of positive electrodes, a plurality of separators, and a plurality of negative electrode. Before the electrode stack is bent, the lengths of the separator 2 and the negative electrode 3 are greater than that of the positive electrode 1 (see A and A').

After the electrode stack is bent, however, opposite ends of the positive electrode 1, which is located inside the separator 2 and the negative electrode 3, protrude further outward from corresponding ends of the separator 2 and the negative electrode 3 (see A and A'). As a result, lithium is separated from the electrode stack during charge of the electrode stack, whereby safety of a lithium secondary battery including the curved electrode stack is lowered. This is because a conventional positive electrode, separator, and negative electrode used for a non-curved electrode stack are applied to the curved electrode stack without any change.

FIG. 2 is a typical view showing a curved jelly-roll type electrode stack 20. Referring to FIG. 2, when the jelly-roll type electrode stack 20 is bent along an imaginary line X'-X" perpendicular to a direction in which electrode terminals protrude, stress is concentrated on bent opposite ends A' and A" of the jelly-roll type electrode stack 20 with the result that the electrodes of the jelly-roll type electrode stack 20 may be broken.

Meanwhile, in recent years, designs of electronic devices have played a very important part in consumers' selection of products, and the size and thickness of the electronic devices have been gradually reduced in response to consumers' taste. In order to minimize unnecessary waste of spaces in the electronic devices, therefore, miniaturization and slimness of a lithium secondary battery are required, and it is necessary to modify the shape of the lithium secondary battery to reflect the shapes of such electronic devices.

In connection with this, Japanese Patent Application Publication No. 1999-307130 discloses a method of manufacturing a crooked battery by thermally pressing a positive electrode impregnated with an electrolytic solution containing a plasticizer, a negative electrode impregnated with an electrolytic solution containing a plasticizer, and a gel type electrolyte layer impregnated with an electrolytic solution containing a plasticizer using two rolls having different diameters.

FIG. 3 shows a crooked electrode stack disclosed in Japanese Patent Application Publication No. 1999-307130. Referring to FIG. 3, the electrode stack includes a crooked positive electrode 1 including a positive electrode layer 4 and a positive electrode current collector 5, a crooked negative electrode 2 including a negative electrode layer 6 and a negative electrode current collector 7, and a crooked gel type electrolyte layer 3. A positive electrode terminal 8 is connected to the positive electrode current collector 5, and a negative electrode terminal 9 is connected to the negative electrode current collector 7. The positive electrode terminal 8 and the negative electrode terminal 9 are formed at non-crooked portions of the electrode stack.

Japanese Patent Application Publication No. 1999-307130 discloses a technology for solving a conventional problem that the crooked electrode stack returns to the original shape thereof. Protection circuit modules known to date each have a planar structure with no curved surface. In consideration of the fact that no conventional curved protection circuit modules have been proposed, therefore, it is understood that Japanese Patent Application Publication No. 1999-307130 does not disclose or recognize a battery pack having a curved protection circuit module mounted thereto.

Furthermore, in a case in which the curved protection circuit module is applied, a very complicated manufacturing process is needed. For example, in a case in which components, such as an integrated circuit (IC), are welded to a crooked surface of the curved protection circuit module, the welding process is very complicated, it is difficult to exhibit desired coupling force, and it is also difficult to manufacture a jig used to mount the curved protection circuit module to a crooked battery cell. Consequently, the curved protection circuit module is limited in its applicability to a battery pack, including a plurality of battery cells, the mass production of which is required.

DISCLOSURE

Technical Problem

The present invention has been made to solve the above problems and other technical problems that have yet to be resolved, and it is an object of the present invention to provide a battery cell including an electrode stack designed such that opposite ends of a positive electrode are covered by corresponding ends of a separator and a negative electrode even in a state in which all of the positive electrode, the separator, and the negative electrode are curved, whereby safety of the battery cell is improved.

It is another object of the present invention to provide a battery pack including a curved protection circuit module that is capable of minimizing unnecessary waste of an internal space of an electronic device, in which the battery pack is mounted, and exhibiting improved volume energy density characteristics.

Technical Solution

In accordance with one aspect of the present invention, the above and other objects can be accomplished by the provision of an electrode stack including at least one positive electrode, at least one negative electrode, and at least one separator, wherein the positive electrode, the negative electrode, and the separator are stacked such that the separator is disposed between the positive electrode and the negative electrode, one end of each of the positive electrode and the negative electrode does not intersect the other end of each of the positive electrode and the negative electrode, a stacked surface of each of the positive electrode, the negative electrode, and the separator includes a curved surface, and the negative electrode have an arc length equal to or greater than that of the positive electrode while the separator has an arc length greater than that of the positive electrode in a state in which the positive electrode, the negative electrode, and the separator are curved.

In a non-limiting example of the present invention, one end of each of the positive electrode and the negative electrode does not intersect the other end of each of the positive electrode and the negative electrode unlike a jelly-roll type electrode stack configured to have a structure in which a positive electrode sheet and a negative electrode sheet are wound in a state in which the positive electrode sheet and the negative electrode sheet are stacked with the result that one end of each of the positive electrode sheet and the negative electrode sheet intersects the other end of each of the positive electrode sheet and the negative electrode sheet.

The negative electrode has a length equal to or greater than that of the curved positive electrode. Specifically, the negative electrode may have a length equivalent to 1.1 to 1.3 times that of the positive electrode. The opposite ends of the curved negative electrode may face corresponding ends of the curved positive electrode in a state in which the separator is disposed between the negative electrode and the positive electrode. In a case in which the opposite ends of the curved negative electrode do not face corresponding ends of the curved positive electrode in a state in which the separator is disposed between the negative electrode and the positive electrode, a short circuit may occur between the positive electrode and the negative electrode. In addition, lithium is separated from the electrode stack during charge of the electrode stack, whereby safety of the electrode stack is lowered. In the present invention, the positive electrode may be configured to have a structure in which a positive electrode material is coated on a portion of the positive electrode other than a positive electrode tab, and the negative electrode may be configured to have a structure in which a negative electrode material is coated on a portion of the negative electrode other than a negative electrode tab.

The positive electrode material may include a well-known lithium metal oxide as a positive electrode active material of a lithium secondary battery. Examples of the lithium metal oxide may include layered compounds such as a lithium cobalt oxide ($LiCoO_2$) and a lithium nickel oxide ($LiNiO_2$), or compounds substituted with one or more transition metals; lithium manganese oxides having formula $Li_{1+y}Mn_{2-y}O_4$ where y=0 to 0.33, such as $LiMnO_3$, $LiMn_2O_3$, and $LiMnO_2$; a lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxides having formula $LiNi_{1-y}M_yO_2$ where M=Co, Mn, Al, Cu, Fe, Mg, B, or Ga and y=0.01 to 0.3; lithium manganese composite oxides having formula $LiMn_{2-y}M_yO_2$ where M=Co, Ni, Fe, Cr, Zn, or Ta and y=0.01 to 0.1 or formula $Li_2Mn_3MO_8$ where M=Fe, Co, Ni, Cu, or Zn; $LiMn_2O_4$ in which some of the Li atoms are substituted with alkaline earth metal ions; disulfide compounds; and $Fe_2(MoO_4)_3$.

The negative electrode material may include a carbon-based material, such as natural graphite, artificial graphite, non-graphitizing carbon, or graphitizing carbon, as a negative electrode active material of the lithium secondary battery. For the carbon-based material, oxidation/reduction potential is about 0.1 V lower than potential of Li/Li+ with the result that lithium may be separated from the electrode stack during charge of the electrode stack. For this reason, the amount of the negative electrode that is loaded may be increased in order to secure a balance between the positive electrode and the negative electrode, or the length of the negative electrode may be designed based on a calculated slippage value of the positive electrode when the positive electrode is bent.

That is, the curved electrode stack may be designed such that the negative electrode has an arc length equal to or greater than that of the curved positive electrode, and the separator has an arc length greater than that of the curved positive electrode according to the present invention. In order to prevent the occurrence of a short circuit between the positive electrode and the negative electrode, the separator may have a length greater than that of the negative electrode and, in addition, a length equivalent to 1.1 to 1.3 times that of the positive electrode.

For the electrode stack, the stacked surface of each of the positive electrode, the negative electrode, and the separator may include a curved surface. Specifically, the curved surface may have a radius of curvature R of 35 mm to 900 mm.

In a non-limiting example of the present invention, one end of each of the positive electrode, the negative electrode, and the separator may not intersect the other end of each of the positive electrode, the negative electrode, and the separator. In this case, the electrode stack may be a stacked type electrode stack.

Meanwhile, the electrode stack may include at least one improved electrode configured to have a structure in which a separator is laminated to one surface or opposite surfaces of the electrode. For example, the improved electrode may be configured to have a structure in which a separator is laminated to one surface of a positive electrode or a negative electrode. In addition, the improved electrode may be configured to have a structure in which separators are laminated to opposite surfaces of a positive electrode or opposite surfaces of a negative electrode. In addition, the improved electrode may be configured to have a structure in which a positive electrode, a separator, and a negative electrode are laminated in a state in which the separator is disposed between the positive electrode and the negative electrode. In this specification, an embodiment example configured to have a structure in which a positive electrode, a separator, and a negative electrode are laminated in a state in which the separator is disposed between the positive electrode and the negative electrode may be defined as an electrode group.

The outermost electrodes of the electrode group may have the same polarity or different polarities. In a case in which the outermost electrodes of the electrode group have the same polarity, the electrode group may be referred to as an S type electrode group. On the other hand, in a case in which the outermost electrodes of the electrode group have different polarities, the electrode group may be referred to as a D type electrode group. At least one of the outermost electrodes may be laminated to separators in a state in which the at least one of the outermost electrodes is disposed between the separators.

In addition, the improved electrode may be configured to have a structure in which one selected from between a positive electrode and a negative electrode is included along with a separator, and one selected from between the positive electrode and the negative electrode is laminated to the separator, which may be referred to as an electrode element. The electrode element may be configured to have a structure in which one selected from between a positive electrode and a negative electrode is laminated to the separators in a state in which one selected from between the positive electrode and the negative electrode is disposed between the separators.

The electrode, the improved electrode, the separator, the electrode group, and the electrode element may be combined to constitute an electrode stack having a structure in which a separator is disposed between a positive electrode and a negative electrode, which is included in the scope of the present invention.

The electrode stack may include at least one non-curved surface. The non-curved surface may be provided at the stacked surface or at a side surface of the electrode stack which is not parallel to the stacked surface. The side surface may be perpendicular to the stacked surface. Electrode tabs may be formed at the non-curved surface. Both a positive electrode tab and a negative electrode tab may be formed at one non-curved surface. Alternatively, a positive electrode tab may be formed at one non-curved surface, and a negative electrode tab may be formed at the other non-curved surface. The electrode tabs may be connected to electrode leads to constitute electrode terminals, which may be connected to a protection circuit module (PCM).

In a non-limiting example of the present invention, the non-curved surface may be formed at each side surface of the electrode stack that is not parallel to the stacked surface. Each side surface may include one or more non-curved surfaces. Both of the positive electrode tab and the negative electrode tab may be formed at one of the side surfaces.

The at least one separator may include a first separator and a second separator. The first separator may be disposed between the positive electrode and the negative electrode in a state in which one end of the first separator does not intersect the other end of the first separator, and the second separator may wrap side surfaces of the electrodes, at which no electrode terminals are formed, while being disposed between the positive electrode and the negative electrode. The second separator is different from the first separator in that one end of the second separator intersects the other end of the second separator.

The electrode stack may be a stacked and folded type electrode stack configured to have a structure in which a plurality of stacked type electrode stacks is arranged on a separator sheet, and then the separator sheet is wound or folded in one direction such that the electrode stacks are stacked.

The electrode stack may be a wound (jelly-roll) type electrode stack configured to have a structure in which a positive electrode sheet, a separator sheet, and a negative electrode sheet, each having a predetermined size, are stacked such that the separator sheet is disposed between the positive electrode sheet and the negative electrode sheet, and then the separator sheet is wound in one direction.

In accordance with another aspect of the present invention, there is provided a battery cell including the electrode stack with the above-stated construction mounted in a battery case together with an electrolyte. The battery case may be a metal can or a pouch-shaped battery case made of a laminate sheet including a metal layer and a resin layer. The battery case may have a shape corresponding to the curved shape of the electrode stack. The battery cell may be a lithium ion polymer battery, a lithium ion battery, or a lithium polymer battery. Known structures and components of the lithium ion polymer battery, the lithium ion battery, and the lithium polymer battery are herein incorporated by reference.

In accordance with another aspect of the present invention, there is provided a battery pack including a battery cell including an electrode stack according to claim 1, a non-aqueous electrolyte containing lithium salt, electrode terminals having opposite polarities, and a battery cell case, wherein the electrode stack is received in the battery cell case together with the electrolyte, both of the positive electrode terminal and the negative electrode terminal are formed at a first surface of the battery cell case, and the first surface comprises a first curved surface, and a protection circuit module connected to the positive electrode terminal and the negative electrode terminal, a second surface of the protection circuit module facing the first surface comprising a second curved surface identical to or similar to the first curved surface.

The first curved surface and the second curved surface may be similar to each other within a similarity ratio of 1:0.90 to 1:0.99 or 1:1.01 to 1:1.10. In a case in which the similarity ratio of the first curved surface to the second curved surface is 1:1, it may be understood that the first curved surface and the second curved surface are identical to each other.

In addition, the first curved surface may have a radius of curvature R1 of 35 mm to 900 mm, and the second curved surface may have a radius of curvature R2 of 35 mm to 900 mm. In a case in which the radius of curvature of each of the first curved surface and the second curved surface is greater than 900 mm, an internal short circuit may occur due to slippage between the separator and the electrodes, which is not desirable.

The radius of curvature R1 of the first curved surface may be equal to the radius of curvature R2 of the second curved surface. On the other hand, the radius of curvature R1 of the first curved surface may not be equal to the radius of curvature R2 of the second curved surface. In a non-limiting example of the present invention, the radius of curvature R1 of the first curved surface may be equal to the radius of curvature R2 of the second curved surface.

In a non-limiting example of the present invention, the protection circuit module may be configured to have a printed circuit board structure in which an electric circuit for preventing overcharge or overdischarge and enabling the flow of rated current is printed, the second curved surface is one surface of the printed circuit board, a safety element and a connection terminal are coupled to one surface of the printed circuit board, and the other surface of the printed circuit board comprises an external input and output terminal connected to a predetermined external device. The printed circuit board may be made of a material exhibiting higher flexibility than a general protection circuit module. Components mounted at the printed circuit board may each have one curved surface corresponding to the curved surface of the battery cell such that the components of the printed circuit board can tightly contact the battery cell.

In accordance with a further aspect of the present invention, there is provided a device including the battery pack with the above-stated construction. Specifically, the battery pack may be used as a power source for a curved smart phone, a curved mobile phone, a curved laptop computer, a curved tablet PC, a curved clock, a curved television, or curved glasses.

DESCRIPTION OF DRAWINGS

The above and other objects, features and other advantages of the present invention will be more clearly understood from the following detailed description taken in conjunction with the accompanying drawings, in which:

FIG. 1 is a view typically showing a state of a stacked type electrode stack before and after the electrode stack is bent;

FIG. 2 is a view typically showing a curved jelly-roll type electrode stack;

FIG. 3 is a perspective view showing a conventional crooked electrode stack;

FIG. 4 is a view typically showing an electrode stack, including a positive electrode, a negative electrode, and a separator, configured to have a structure in which the separator and the negative electrode have larger arc lengths than the positive electrode in a state in which all of the positive electrode, the negative electrode, and the separator are curved according to a non-limiting embodiment of the present invention;

FIGS. 5 and 6 are views typically showing various embodiment examples of the electrode stack of FIG. 4;

FIG. 7 is a perspective view showing a battery pack including a curved protection circuit module according to a non-limiting embodiment of the present invention;

FIGS. 8 and 9 are views typically showing various embodiment examples of an electrode stack mounted in the battery pack of FIG. 7; and FIGS. 10 to 14 are views typically showing various embodiment examples of an improved electrode constituting the electrode stack of FIG. 5.

BEST MODE

Now, exemplary embodiments of the present invention will be described in detail with reference to the accompanying drawings. It should be noted, however, that the scope of the present invention is not limited by the illustrated embodiments.

FIG. 4 is a view typically showing an electrode stack, including a positive electrode 101, a separator 102, and a negative electrode 103, configured to have a structure in which the separator 102 is disposed between the positive electrode 101 and the negative electrode 103 according to a non-limiting embodiment of the present invention. For the convenience of description, a structure in which one positive electrode 101, one separator 102, and one negative electrode 103 are stacked is shown in FIG. 4. Alternatively, the electrode stack may include a plurality of positive electrodes, a plurality of separators, and a plurality of negative electrodes. Referring to FIG. 4, it can be seen that opposite ends of the positive electrode 101 are covered by corresponding ends of the separator 102 and the negative electrode 103 in a state in which all of the positive electrode 101, the separator 102, and the negative electrode 103 are curved.

FIGS. 5 and 6 are views showing various embodiment examples of the electrode stack of FIG. 4. Referring to FIG. 5, an electrode stack 100 includes a positive electrode 101, a separator 102, and a negative electrode 103. The separator 102 is disposed between the positive electrode 101 and the negative electrode 103. The positive electrode 101 is provided with a positive electrode tab 104 having no positive electrode material applied thereto, and the negative electrode 103 is provided with a negative electrode tab 105 having no negative electrode material applied thereto. One end of each of the positive electrode 101, the separator 102, and the negative electrode 103 does not intersect the other end of each of the positive electrode 101, the separator 102, and the negative electrode 103.

In the electrode stack 100, a curved surface is formed at a stacked surface of each of the positive electrode 101, the separator 102, and the negative electrode 103, and non-curved surfaces are formed at two side surfaces that are not parallel to the stacked surface. The positive electrode tab 104 and the negative electrode tab 105 are formed at one of the two side surfaces. The positive electrode tab 104 and the negative electrode tab 105 are coupled to a positive electrode lead (not shown) and a negative electrode lead (not shown) to form a positive electrode terminal and a negative electrode terminal, respectively.

Referring to FIG. 5 together with FIG. 4, when the electrode stack 100 of FIG. 5 is bent along an imaginary line X'-X" perpendicular to a direction in which the positive electrode tab 104 and the negative electrode tab 105 protrude, opposite ends of the positive electrode 101 may be covered by corresponding ends of the separator 102 and the negative electrode 103 as shown in FIG. 4. That is, as shown in FIG. 4, the separator 102 and the negative electrode 103 have larger arc lengths than the positive electrode 101 in a state in which the positive electrode, the negative electrode, and the separator are curved.

Referring to FIG. 6, an electrode stack 200 is configured to have a structure in which the electrode stack 100 of FIG. 5, including the positive electrode 101, the separator 102, and the negative electrode 103, configured to have a structure in which the separator 102 is disposed between the positive electrode 101 and the negative electrode 103, is arranged on a separator sheet 107, and the separator sheet 107 is wound in one direction such that the separator sheet 107 wraps side surfaces of the electrodes, at which the positive electrode tab 104 and the negative electrode tab 105 are not formed. One end of the separator sheet 107 intersects the other end of the separator sheet 107.

Referring to FIG. 6 together with FIG. 4, when the electrode stack 200 of FIG. 6 is bent along an imaginary line X'-X" perpendicular to a direction in which the positive electrode tab 104 and the negative electrode tab 105 protrude, opposite ends of the positive electrode 101 may be covered by corresponding ends of the separator 102 and the negative electrode 103 as shown in FIG. 4. The separator 102 may function as the first separator as previously described, and the separator sheet 107 may function as the second separator as previously described.

The electrode stack 100 of FIG. 5 may be a stacked type electrode stack. Alternatively, the electrode stack 100 may include at least one improved electrode configured to have a structure in which the separator 102 is laminated to one surface or opposite surfaces of each of the electrodes 101 and 103.

FIG. 7 is a view typically showing a battery pack including a curved protection circuit module according to a non-limiting embodiment of the present invention. Referring to FIG. 7, the battery pack 500 may include a battery cell 300 including a positive electrode terminal 310 and a negative electrode terminal 320 formed at a first surface 331 of a battery cell case 330 and a protection circuit module 400. The first surface 331 may be curved in an arc shape along an imaginary line Y-Y' passing between the positive electrode terminal 310 and the negative electrode terminal 320.

The protection circuit module 400 is configured to have a printed circuit board structure. One surface of the printed circuit board facing the first surface 331 may be a second curved surface identical to or similar to the first surface. A safety element (not shown) and a connection terminal (not shown) may be coupled to one surface of the printed circuit board, and the other surface of the printed circuit board may include an external input and output terminal 410 connected to a predetermined external device.

FIG. 8 is a view showing a stacked type electrode stack 200A constituting the battery cell 300 of FIG. 7. For the convenience of description, a structure in which one positive electrode 101, one separator 102, and one negative electrode 103 are stacked is shown in FIG. 8. On the other hand, the electrode stack 200A may include a plurality of positive electrodes, a plurality of separators, and a plurality of negative electrodes.

Referring to FIG. 8, the stacked type electrode stack 200A includes a positive electrode 101, a separator 102, and a negative electrode 103. The separator 102 is disposed between the positive electrode 101 and the negative electrode 103. The positive electrode 101 is provided with a positive electrode tab 101A having no positive electrode material applied thereto, and the negative electrode 103 is provided with a negative electrode tab 103A having no negative electrode material applied thereto. One end of each of the positive electrode 101, the separator 102, and the negative electrode 103 does not intersect the other end of each of the positive electrode 101, the separator 102, and the negative electrode 103. A first surface 230A of the electrode stack 200A is curved in an arc shape along an imaginary line W-W' passing between the positive electrode tab 101A and the negative electrode tab 103A. The positive electrode tab 101A may be coupled to a positive electrode lead (not shown) to form the positive electrode terminal 310, and the negative electrode tab 103A may be coupled to a negative electrode lead (not shown) to form the negative electrode terminal 320.

FIG. 9 is a view showing a jelly-roll type electrode stack 200B constituting the battery cell 300 of FIG. 7. The jelly-roll type electrode stack 200B of FIG. 9 is configured to have a structure in which a positive electrode tab 101B and a negative electrode tab 103B are formed at one surface 230B of the electrode stack 200B, and the surface 230B is curved in an arc shape along an imaginary line Z-Z' passing between the positive electrode tab 101B and the negative electrode tab 103B.

The stacked type electrode stack 200A of FIG. 8 may include at least one improved electrode configured to have a structure in which the separator 102 is laminated to one surface or opposite surfaces of each of the electrodes 101 and 103. An improved electrode configured to have a structure in which a separator is laminated to one surface or opposite surfaces of at least one electrode may have various structures as shown in FIGS. 10 to 14. However, the present invention is not limited to the structures shown in FIGS. 10 to 14.

FIG. 10 is a view typically showing a first embodiment example 110 configured to have a structure in which a separator 102 is laminated to one surface of a positive electrode 101. FIG. 11 is a view typically showing a second embodiment example 120 configured to have a structure in which separators 102 are laminated to opposite surfaces of a positive electrode 101. FIG. 12 is a view typically showing a third embodiment example 130 configured to have a structure in which a positive electrode 101, a separator 102, and a negative electrode 103 are laminated in a state in which the separator 102 is disposed between the positive electrode 101 and the negative electrode 103. FIG. 13 is a view typically showing a fourth embodiment example 140 configured to have a structure in which the positive electrode 101, which is one of the outermost electrodes 101 and 103 of the third embodiment example 130 of FIG. 12, is laminated to separators 102 in a state in which the positive electrode 101 is disposed between the separators 102. FIG. 14 is a view typically showing a fifth embodiment example 150 configured to have a structure in which the outermost electrodes 101 and 103 of the third embodiment example 130 of FIG. 12 are laminated to separators 102 in a state in which the electrodes 101 and 103 are disposed between the separators 102. The second embodiment example 120 may be referred to as an electrode element, and the third embodiment example 130 may be referred to as an electrode group.

The electrode stack 100 may include a combination of a plurality of positive electrodes 101, a plurality of separators 102, a plurality of negative electrodes 103, and one or more selected from a group consisting of a first embodiment example 110, a second embodiment example 120, a third embodiment example 130, a fourth embodiment example 140, and a fifth embodiment example 150.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention includes an electrode stack, including a positive electrode, a negative electrode, and a separator, configured to have a structure in which the negative electrode has an arc length equal to or greater than that of the positive electrode while the separator has an arc length greater than that of the positive electrode in a state in which all of the positive electrode, the negative electrode, and the separator are curved. Consequently, the battery cell according to the present invention exhibits improved safety.

In addition, a battery pack according to the present invention includes a curved protection circuit module that is capable of minimizing unnecessary waste of an internal space of an electronic device, in which the battery pack is mounted, and exhibiting improved volume energy density characteristics.

The invention claimed is:

1. An electrode stack comprising:
   a positive electrode;
   a negative electrode; and
   a separator disposed between the positive electrode and the negative electrode;
   wherein the positive electrode, the negative electrode, and the separator are stacked, one end of each of the positive electrode and the negative electrode does not intersect the other end of each of the positive electrode and the negative electrode, a stacked surface of each of the positive electrode, the negative electrode, and the separator comprises a curved surface, the electrode stack having a curvature and an imaginary center of curvature, the positive electrode being disposed closest to the center of curvature, the negative electrode having an arc length greater than that of the positive electrode and the separator having an arc length greater than that of the positive electrode, and
   wherein the separator is a first separator, the electrode stack further comprising a second separator, and the second separator wraps side surfaces of the electrodes, at which no electrode terminals are formed.

2. The electrode stack according to claim 1, wherein the negative electrode has a length equivalent to 1.1 to 1.3 times that of the positive electrode.

3. The electrode stack according to claim 1, wherein the separator has a length equivalent to 1.1 to 1.3 times that of the positive electrode.

4. The electrode stack according to claim 1, wherein the electrode stack comprises at least one non-curved surface.

5. The electrode stack according to claim 1, wherein a side surface of the electrode stack that is not parallel to the stacked surface comprises one or more non-curved surfaces.

6. The electrode stack according to claim 5, wherein electrode tabs are formed at the one or more non-curved surfaces.

7. The electrode stack according to claim 5, wherein both a positive electrode tab and a negative electrode tab are formed at a same one of the one or more non-curved surfaces of the electrode stack.

8. The electrode stack according to claim 5, wherein a positive electrode tab is formed at one of the one or more non-curved surfaces of the electrode stack, and a negative electrode tab is formed at the other of the one or more non-curved surfaces of the electrode stack.

9. The electrode stack according to claim 1, wherein one end of each of the positive electrode, the negative electrode, and the separator does not intersect the other end of each of the positive electrode, the negative electrode, and the separator.

10. The electrode stack according to claim 9, wherein the separator is laminated to one surface or opposite surfaces of at least one selected from between the positive electrode and the negative electrode.

11. The electrode stack according to claim 10, wherein the electrode stack comprises an electrode group comprising the positive electrode, the negative electrode, and the separator, the electrode group being configured to have a structure in which the positive electrode, the separator, and the negative electrode are laminated in a state in which the separator is disposed between the positive electrode and the negative electrode.

12. The electrode stack according to claim 11, wherein the electrode group is configured to have a structure in which outermost ones of the electrodes have the same polarity.

13. The electrode stack according to claim 12, wherein the first separator comprises two first separators, and wherein at least one of the outermost electrodes is laminated to the first separators in a state in which the at least one of the outermost electrodes is disposed between the first separators.

14. The electrode stack according to claim 10, wherein the electrode stack comprises an electrode element comprising one selected from between the positive electrode and the negative electrode and the separator, the electrode element being configured to have a structure in which one selected from between the positive electrode and the negative electrode is laminated to the separator.

15. The electrode stack according to claim 14, wherein the first separator comprises two first separators, and wherein the electrode element is configured to have a structure in which one selected from between the positive electrode and the negative electrode is laminated to the first separators in a state in which one selected from between the positive electrode and the negative electrode is disposed between the first separators.

16. The electrode stack according to claim 1, wherein one end of the second separator intersects the other end of the second separator.

17. A battery cell comprising an electrode stack according to claim 1 mounted in a battery case together with an electrolyte.

18. The battery cell according to claim 17, wherein the battery case is a metal can or a pouch-shaped battery case made of a laminate sheet comprising a metal layer and a resin layer.

19. The battery cell according to claim 17, wherein the battery cell is a lithium ion polymer battery, a lithium ion battery, or a lithium polymer battery.

20. A battery pack comprising:
    a battery cell comprising an electrode stack according to claim 1, a non-aqueous electrolyte containing lithium salt, electrode terminals having opposite polarities, and a battery cell case, wherein the electrode stack is received in the battery cell case together with the electrolyte, both of the positive electrode terminal and the negative electrode terminal are formed at a first surface of the battery cell case, and the first surface comprises a first curved surface; and
    a protection circuit module connected to the positive electrode terminal and the negative electrode terminal, a second surface of the protection circuit module facing the first surface comprising a second curved surface identical to or similar to the first curved surface.

21. The battery pack according to claim 20, wherein the first curved surface and the second curved surface are similar to each other within a similarity ratio of 1:0.90 to 1:0.99 or 1:1.01 to 1:1.10.

22. The battery pack according to claim 20, wherein the first curved surface has a radius of curvature (R1) of 35 mm to 900 mm, and the second curved surface has a radius of curvature (R2) of 35 mm to 900 mm.

23. The battery pack according to claim 22, wherein the radius of curvature (R1) of the first curved surface is equal to the radius of curvature (R2) of the second curved surface.

24. The battery pack according to claim 20, wherein the protection circuit module is configured to have a printed circuit board structure in which an electric circuit for preventing overcharge or overdischarge and enabling flow of rated current is printed, the second curved surface is one surface of the printed circuit board, a safety element and a connection terminal are coupled to one surface of the printed circuit board, and the other surface of the printed circuit board comprises an external input and output terminal connected to a predetermined external device.

25. A device comprising a battery pack according to claim 20.

26. The device according to claim 25, wherein the device is a smart phone, a mobile phone, a laptop computer, a tablet PC, a clock, a television, or glasses.

27. The electrode stack according to claim 11, wherein the electrode group is configured to have a structure in which outermost ones of the electrodes have different polarities.

* * * * *